(12) United States Patent
Smith

(10) Patent No.: US 9,198,541 B2
(45) Date of Patent: Dec. 1, 2015

(54) HERB GRINDER

(71) Applicant: Jeff Smith, Needham, MA (US)

(72) Inventor: Jeff Smith, Needham, MA (US)

(*) Notice: Subject to any disclaimer, the term of this patent is extended or adjusted under 35 U.S.C. 154(b) by 330 days.

(21) Appl. No.: 13/871,049

(22) Filed: Apr. 26, 2013

(65) Prior Publication Data

US 2014/0319249 A1  Oct. 30, 2014

(51) Int. Cl.
*A47J 43/25* (2006.01)

(52) U.S. Cl.
CPC ........................................ *A47J 43/25* (2013.01)

(58) Field of Classification Search
CPC ....................................................... A47J 43/25
USPC ............................................. 241/168–169.2
See application file for complete search history.

(56) References Cited

U.S. PATENT DOCUMENTS

| | | | |
|---|---|---|---|
| 1,099,896 A | 6/1914 | Harbeck | |
| 2,025,821 A | 12/1935 | Nordmarken | |
| 3,741,104 A * | 6/1973 | Kannegiesser | 99/495 |
| 4,135,672 A | 1/1979 | Schlessel | |
| 4,280,666 A | 7/1981 | Jones | |
| 4,765,549 A | 8/1988 | Sherman | |
| D365,413 S | 12/1995 | Dolan et al. | |
| 5,950,876 A | 9/1999 | McLelland et al. | |
| 6,247,661 B1 | 6/2001 | Chainani | |
| D474,378 S | 5/2003 | Brandenburg | |
| 6,663,031 B2 | 12/2003 | Henderson et al. | |
| D634,989 S | 3/2011 | Griffin et al. | |

* cited by examiner

*Primary Examiner* — Mark Rosenbaum
(74) *Attorney, Agent, or Firm* — Lambert & Associates; Gary E. Lambert; David J. Connaughton, Jr.

(57) ABSTRACT

An herb grinder is provided. The herb grinder has a top portion and upper chamber wherein herbs and similar materials may be ground. Further, the herb grinder has a spout, allowing ground herbs and materials to exit the grinder without separating the parts of the grinder.

21 Claims, 4 Drawing Sheets

HERB GRINDER

BACKGROUND OF THE INVENTION

1. Field of the Invention

The present invention relates generally to herb grinders. More particularly the present invention relates to a device to grind herbs and easily pour them out once ground.

2. Description of Related Art

Herb grinders are important tools to break down herbs, spices, and the like from solid or dense masses into more fine substances. Currently, herb grinders are structured such that there is not an easy or convenient way to get the ground contents out of the grinder. Currently, options include pinching the contents out, or dumping them from a vessel that is not configured for pouring.

Therefore, what is needed is an herb grinder that allows for easy and efficient removal of the ground herbs from the grinder.

SUMMARY OF THE INVENTION

The subject matter of this application may involve, in some cases, interrelated products, alternative solutions to a particular problem, and/or a plurality of different uses of a single system or article.

In one aspect, an herb grinder is provided. The grinder comprises a top portion, upper chamber, lower chamber, and bottom portion, all removably attachable together. The top portion is formed as a disc having a substantially circular cross section. Further, the top portion may have a quantity of teeth protruding from its bottom surface. The upper chamber may be rotatably connected to the top portion, and may form a cavity in which an herb for grinding may be placed. A second quantity of teeth protrude from a lower surface of the cavity, extending towards the quantity of teeth of the top portion when the two are attached. An aperture or plurality of apertures may be formed by the lower surface of the cavity. The aperture passes through the upper chamber, allowing ground herbs to exit the upper chamber once ground. A lower chamber may be removably connected to the upper chamber, the aperture of the upper chamber communicating with a cavity of the lower chamber. A spout is formed by an edge wall of the lower chamber. The spout being capable of an open position, allowing passage of the ground herbs out of the cavity of the lower chamber, and a closed position, preventing passage of the ground herbs out of the cavity of the lower chamber. Finally, a bottom portion may be attached to an underside of the lower chamber.

In another aspect, a method of grinding herbs is provided. The method may begin with placing a quantity of unground herbs in a cavity of an upper chamber of an herb grinder. A top portion and the upper chamber may be rotated against each other, grinding the herbs and allowing the ground herbs to pass through an aperture or apertures of the upper chamber into a lower chamber. A spout of the lower chamber may be opened to allow removal of the ground herbs while the upper chamber and lower chamber remain attached to each other.

DETAILED DESCRIPTION

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns an herb grinder configured to grind and break up herbs manually. The ground herbs fall to a lower chamber, and may be conveniently poured out or otherwise removed from a spout or similar opening. The spout may be any structure that allows ground herbs to be poured or removed through it.

The term herb is used herein to relate to not only herbs but any other plant based material such as leaves, stems, seeds, sticks, roots, bark, spices, and the like. The herbs ground in the grinder may be dried, or may be fresh.

Figure 1:
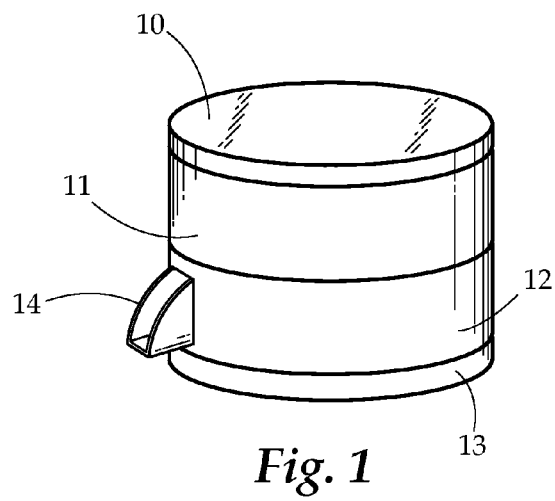
FIG. 1 provides a perspective view of an embodiment of the herb grinder.

Turning now to FIG. 1 a perspective view of the herb grinder is provided. The herb grinder has a circular cross section, and a substantially cylindrical shape. A top portion 10, upper chamber 11, lower chamber 12 and bottom portion 13 are all shown attached to each other, and have substantially the same circular cross section. The top portion 10 and upper chamber 11 are rotatably attached to each other. Teeth (not shown) extend from the top portion 10 and upper chamber 11 and facilitate the grinding of herbs when rotated against each other. Ground herbs may pass into the lower chamber 12. In this lower chamber, a spout 14 is openable and closable, allowing the ground herbs to be removed from of the grinder through the spout 14. This spout 14 is pivotally attached to the lower chamber 12, and may pivot to an open position, as shown, and to a closed position, such that its bottom edge substantially seals against the lower chamber 12. The spout 14, when in a closed position may fully seal the lower chamber from spillage of any ground herbs therein, or may at least partially seal it, preventing a notable loss of the ground herbs.

The herb grinder and components may be made of any material capable of grinding herbs. Examples of materials of which the herb grinder and components may be made include, but are not limited to: metals, plastics, composites, wood, and the like.

It should be understood that while the spout 14 is shown here as a pivoting closure, the spout may be any structure that may allow opening and closing, and that may allow pouring, escape, removal, or the like, of ground herbs from the lower chamber 12 in an open position. The spout may further be any structure that prevents a notable loss of ground herbs in the lower chamber 12 when in a closed position. In another embodiment, the spout may be a hinged door that may swing open and closed, either from a top, bottom, left, or right side. In yet another embodiment, the spout may be configured as a drawer that pulls or pivots outward from the lower chamber. This drawer may be partially or fully removable from the lower chamber, and may be either spring loaded or not. In still another embodiment, the spout may be a revolving door such that as the door is rotated, contents may be removed. In this embodiment, the door may be rotatable either horizontally or vertically. In yet still another embodiment, the spout may be an aperture formed by a wall of the lower chamber, and a plug. The plug may be removable from the aperture to form an open spout, and secured within the aperture, forming a closed spout. The plug may be freely removable, or may have a chain or similar connector connecting it to the grinder. In another embodiment, the spout may be a sliding door that may slide along an inside, outside, or into a wall of the lower chamber. The lower chamber may form an aperture that may be covered or exposed by the sliding door. In one embodiment, the spout may be held in a closed position by a spring, magnet, friction, latches, and the like.

Further still, the spout may be openable and closable in any manner. In one embodiment, the spout may be held in place by friction, gravity, or a spring force, such that the door may be manually opened and/or closed. In another embodiment, a button may open and/or close the spout. In yet another embodiment, a lever may be used to open and/or close the spout.

Figure 2:
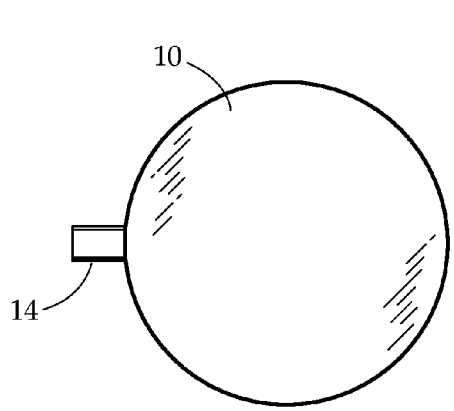
FIG. 2 provides a top view of an embodiment of the herb grinder.

FIG. 2 provides a top view of the grinder. The top portion 10 can be seen, as well as the spout 14 in an open position.

Figure 3:
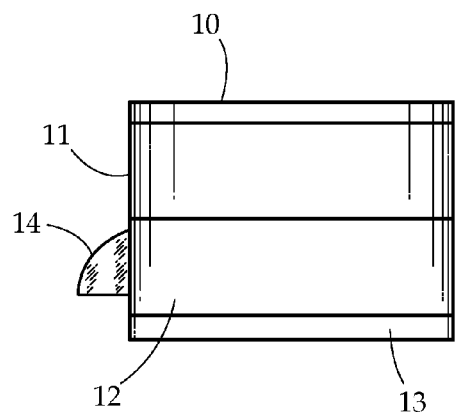
FIG. 3 provides a side view of an embodiment of the herb grinder.

FIG. 3 provides a side view of the grinder. The top portion 10 is shown rotatably connected to the upper chamber 11. Below the upper chamber 11 is the lower chamber 12 into which the ground herbs may pass. The spout 14 is shown in an open position, and allows the passage of the ground herbs from the lower chamber 12. The bottom portion 13 attaches to the lower chamber 12.

Figure 4:
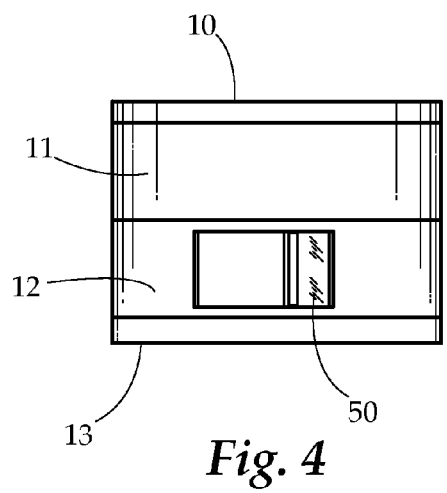
FIG. 4 provides a front view of an embodiment of the herb grinder.

FIG. 4 provides a front view of an alternative embodiment of the herb grinder. In this embodiment, the top portion 10, upper chamber 11, lower chamber 12 and bottom portion 13 are similar to prior embodiments. However, the spout 50 in this embodiment is formed as a spring loaded door that may slide horizontally open, and is biased in a closed position. The spout 50 is shown here in an open position. The spout 50 when in an open position allows the ground herbs to escape from the lower chamber 12.

Figure 5:
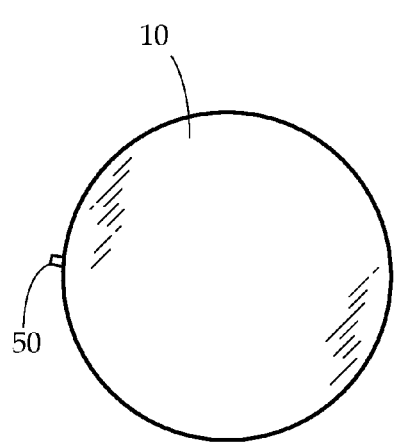
FIG. 5 provides a top view of an embodiment of the herb grinder.

The spout 50 shown in FIG. 5 as a sliding door may be configured in any manner. For example, the spout may slide along an inside or outside wall of the lower chamber. A protruding piece may facilitate the movement of the spout door from an open to closed position. In an alternative embodiment, the door may be slid vertically instead of horizontally.

As noted previously, it should be understood that the spout may be of any structure or construction that may allow passage of the ground herbs from the lower chamber 12 in an open position, and prevent passage of the ground herbs from the lower chamber 12 in a closed position.

FIG. 5 provides a top view of an embodiment of the herb grinder. In this view the spout 50 edge can be seen in a closed position with a protrusion of the door visible.

Figure 6:
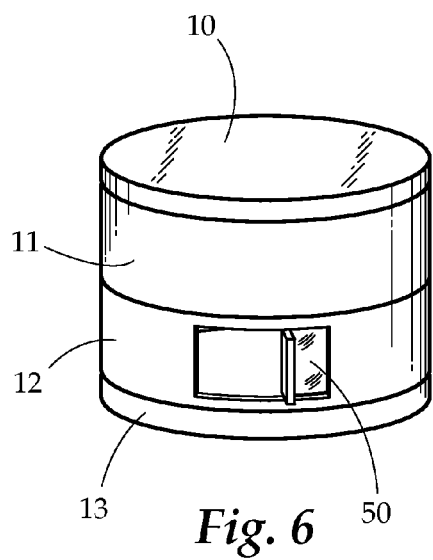
FIG. 6 provides a perspective view of an embodiment of the herb grinder.

FIG. 6 provides a perspective view of an embodiment of the herb grinder. In this embodiment, the spout 50 is shown in an open position. The spout 50 may be slideable from open to closed, and in some embodiments may be spring loaded and biased in a closed position. As such, a user may urge the spout 50 into an open position, release the ground herbs, and release the spout 50. Once the spout 50 is released, in springed embodiments, it will return to a closed position by force of the spring (not shown). In this embodiment, the door slides along an inside of the grinder, however, in other embodiments, the door may slide along an outer surface, or may slide within a pocket formed by the lower chamber of the grinder.

Figure 7:
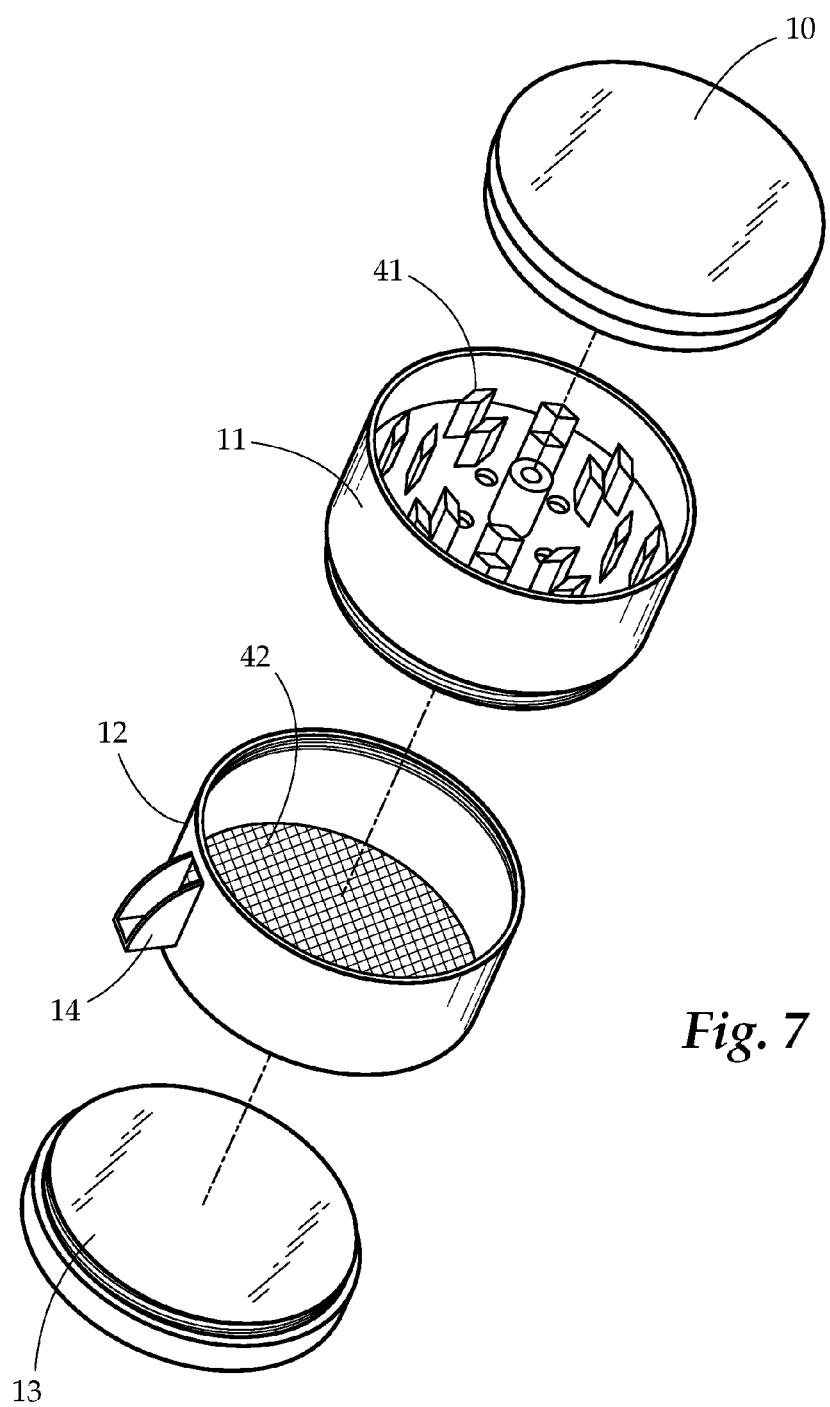
FIG. 7 provides an exploded view of an embodiment of the herb grinder.

FIG. 7 provides an exploded view of an embodiment of the herb grinder. The top portion 10 is positioned above the upper chamber 11. Teeth 41 extend from the upper chamber 12 and facilitate the grinding of herbs. Additional teeth (not shown) may extend from a lower surface of the top portion. A lower chamber 12 receives the upper chamber 11. A mesh screen 42 catches ground herbs, while allowing very fine particles to pass into the bottom portion 13. A spout 14 is shown opened from the lower chamber 12, allowing herbs to be removed from the lower chamber without removing the upper chamber 11.

Figure 8:
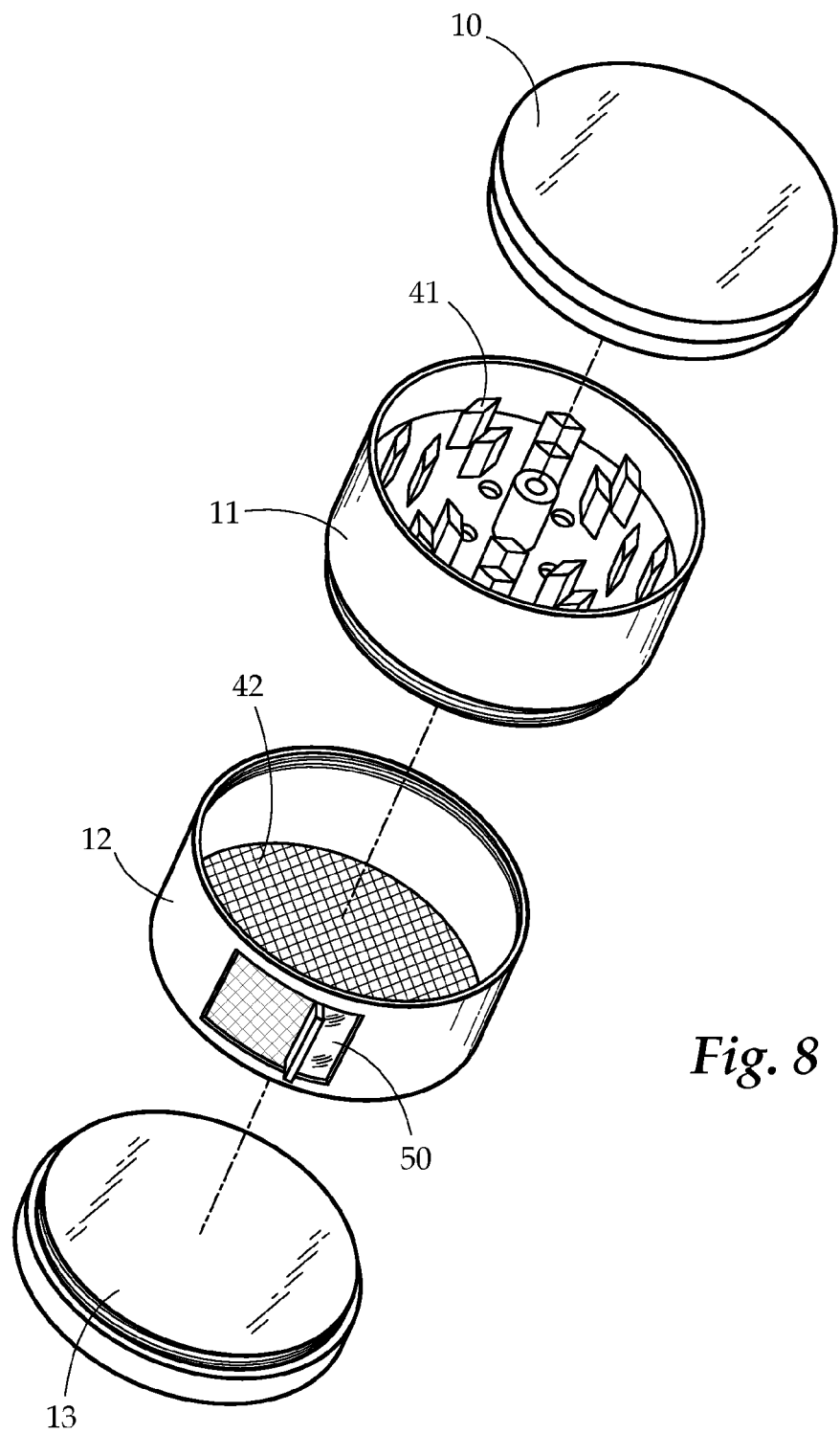
FIG. 8 provides an exploded view of another embodiment of the herb grinder

FIG. 8 provides an exploded view of another embodiment of the herb grinder. In this embodiment, the spout 50 is formed as a sliding door. In one embodiment, door may be spring loaded and biased in a closed position.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. An herb grinder comprising:
    a top portion having a substantially circular cross section, a quantity of teeth protruding from a bottom surface of the top portion;
    an upper chamber, the upper chamber rotatably connected to the top portion, the upper chamber forming a cavity in which an herb for grinding may be placed, a second quantity of teeth protrude from a lower surface of the cavity, extending towards the quantity of teeth of the top portion, an aperture being defined by the lower surface of the cavity that passes through the upper chamber, the aperture allowing ground herbs to exit the upper chamber once ground;
    a lower chamber removably connected to the upper chamber, the aperture of the upper chamber communicating with a cavity of the lower chamber; and
    a spout formed by an edge wall of the lower chamber, the spout having an open position allowing passage of the ground herbs out of the lower chamber cavity, and having a closed position preventing passage of the ground herbs out of the cavity of the lower chamber.

2. The herb grinder of claim 1 further comprising a bottom portion attached to an underside of the lower chamber.

3. The herb grinder of claim 2 wherein a bottom of the lower chamber further comprises a screen, the screen allowing passage of fine particles into the bottom portion.

4. The herb grinder of claim 2 wherein the bottom portion is threadedly connected to the lower chamber.

5. The herb grinder of claim 1 wherein the spout is pivotable away from the lower chamber to bring it from a closed to open position.

6. The herb grinder of claim 1 wherein the spout is spring loaded, and biased in a closed position.

7. The herb grinder of claim 1 wherein the spout is a sliding door slideable between the open and closed position.

8. The herb grinder of claim 7 wherein the spout further comprises an outward protrusion.

9. The herb grinder of claim 7 wherein the spout is spring loaded, and biased in a closed position.

10. The herb grinder of claim 1 wherein the lower chamber is threadedly connected to the upper chamber.

11. The herb grinder of claim 1 wherein the spout is sector shaped, the spout having two sector shaped faces, one edge of the sectors connected by a flat connector, the other edge of the sectors being open, the sector pivotably attached to the lower chamber at its pointed end.

12. The herb grinder of claim 1 wherein the spout is configured as a revolving door, the revolving door rotatable to an open and closed position.

13. The herb grinder of claim 1 wherein the spout is configured as a hinged door, the hinged door being hingedly connected to the lower chamber at one edge.

14. The herb grinder of claim 1 wherein the spout is formed as an aperture in the lower chamber, the grinder further comprising a plug sized to fit within the aperture when the spout is in the closed position.

15. The herb grinder of claim 1 wherein the spout is held in the closed position by a magnet.

16. The herb grinder of claim 1 wherein the spout is a removable drawer.

17. The herb grinder of claim 1 wherein the lower chamber further comprises a button configured to open the spout.

18. The herb grinder of claim 1 wherein the lower chamber further comprises a lever configured to close the spout.

19. A method of grinding herbs comprising the steps of:
placing a quantity of unground herbs in a cavity of an upper chamber of an herb grinder, the upper chamber rotatably connected to a top portion, the top portion having a substantially circular cross section, a quantity of teeth protruding from a bottom surface of the top portion, and a second quantity of teeth protruding from a lower surface of the cavity and extending towards the quantity of teeth of the top portion, an aperture being defined by the lower surface of the cavity that passes through the upper chamber, the aperture allowing ground herbs to exit the upper chamber once ground;
rotating the top portion and the upper chamber in opposite directions, thereby grinding the unground herbs between the quantity of teeth and second quantity of teeth, the ground herbs passing through the aperture into a lower chamber;
opening a spout of the lower chamber; and
removing the ground herbs from the lower chamber through the opened spout.

20. The method of grinding herbs of claim 18 wherein the step of opening the spout is performed against a spring force urging the spout closed.

21. The method of grinding herbs of claim 19 wherein the step of removing the ground herbs from the lower chamber comprises the step of pouring the ground herbs out.

* * * * *